(12) United States Patent
Nettles et al.

(10) Patent No.: US 6,882,353 B2
(45) Date of Patent: Apr. 19, 2005

(54) TRANSMISSION OF LOCALE INFORMATION

(75) Inventors: William B. Nettles, San Jose, CA (US); Daniel A. Rose, Markham (CA); Baldev S. Soor, Markham (CA)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 10/104,392

(22) Filed: Mar. 22, 2002

(65) Prior Publication Data

US 2003/0179225 A1 Sep. 25, 2003

(30) Foreign Application Priority Data

Apr. 3, 2001 (CA) .............................................. 2343496

(51) Int. Cl.⁷ ................................................ G06F 3/00
(52) U.S. Cl. ...................................... 345/764; 345/762
(58) Field of Search ............................... 345/762, 763, 345/764, 765

(56) References Cited

U.S. PATENT DOCUMENTS 5,613,122 A * 3/1997 Burnard et al. ................ 713/1

* cited by examiner

*Primary Examiner*—Cao (Kevin) Nguyen
(74) *Attorney, Agent, or Firm*—A. Bruce Clay

(57) ABSTRACT

A locale identification triplet is provided and a related computer implemented method, computer system and computer program for making practical use of the locale identification triplet. The identifier includes a table identifier, locale version identifier and a locale token. The locale token is the only mandatory identifier in the triplet and addresses the need to uniquely identify desired localization specifications through a concise unambiguous hexadecimal format. The locale version identifier addresses the need to allow multiple variations of the locale specification defined for a given "root" locale, and the table identifier addresses the need to provide a mechanism to identify and distinguish a particular instance of a locale with regards to an environment (such as a system) or reference to an installation/application/user provided reference table.

16 Claims, 6 Drawing Sheets

| Table ID | Locale Version ID | Locale Token ID | Language ID | Country ID | CCS ID | CS ID | CP ID | Long Name | Comment |
|---|---|---|---|---|---|---|---|---|---|
| 0 | 0 | 1C2A | en | CA | 25 | 697 | 37 | en_CA.IBM037 | EBCDIC Latin-1 English |
| | 0 | 1C3A | en | CA | 1140 | 695 | 1140 | en_CA.IBM1140@euro | EBCDIC Latin-1 EURO |
| | 0 | 1C2B | fr | CA | 25 | 697 | 37 | fr_CA.IBM037 | EBCDIC Latin-1 French |
| | 6000 | 1C2A | en | CA | 25 | 697 | 37 | en_CA.IBM037@caps_first | EBCDIC Latin-1 English capital letters before lower case |

FIGURE 3A

| Table ID | Locale Version ID | Locale Token ID | Language ID | Country ID | CCS ID | CS ID | CP ID | Long Name | Comment |
|---|---|---|---|---|---|---|---|---|---|
| 5 | 0 | 1C2A | en | CA | 25 | 697 | 37 | en_CA.IBM037 | EBCDIC Latin-1 English |
|  | 0 | 1C3A | en | CA | 1140 | 695 | 1140 | en_CA.IBM1140@euro | EBCDIC Latin-1 EURO |
|  | 0 | 1C2B | fr | CA | 25 | 697 | 37 | fr_CA.IBM037 | EBCDIC Latin-1 French |

FIGURE 3B

TRANSMISSION OF LOCALE INFORMATION

FIELD OF THE INVENTION

The present invention relates to the selection and control of localization settings for internationalized software applications and more particularly, to the transmission of locale information among processes, components and systems within computer networks. A computer system, a computer implemented method and a computer program are provided to implement locale information for such software applications.

BACKGROUND OF THE INVENTION

In order for an application program to be practically useful it must be capable of presenting information which reflects cultural preferences (language and conventions) for the users of the application program. Typically, the cultural preference of information provided by an application program is customized for a specific market (geographical region or country). ISO/IEC 9945-1:1990 (IEEE Standard 1003.2-1990) Information Technology-portable Operating System Interface (pOSIX™) Shell and Utilities was established to provide a vehicle for the development of portable application programs. IEEE Standard 1003.1 describes a set of basic system services for input/output, file system access, and process management to be used in the development of application programs. The standard also defines an interface accessible from the C programming language, which provides access to these services and establishes standard semantics and syntax. This interface allows application program developers to write portable applications in the C programming language.

In compliance with IEEE Standard 1003.1, IEEE Standard 1003.2 was developed to facilitate the internationalization of applications which did not require the application program developer to customize the application program for each cultural market. IEEE Standard 1003.2 defines a source code level interface to shell services and common utilities which is independent of IEEE Standard 1003.1. An extension of this standard is the User portability Extension (UpE) (IEEE Standard 1003.2a) that addresses interactive terminal-oriented utilities such as full screen editors.

The IEEE Standards 1003.2 and 1003.2a are based on a "locale" model which provides the binding methodology for combining user preferences for language and conventions with the functions of the internationalized application program at run-time. The locale model describes the user's language or conventions to the application program and conveys it to the application at run-time so that the data is processed and presented correctly according to the needs of the user.

The locale model defines six categories of cultural variables, which are collectively referred to as "locale categories". The locale categories are:

LC_COLLATE specifies the character collation or ordering sequence.
LC_CTYPE specifies the character attributes and mappings.
LC_MONETARY specifies the monetary formatting.
LC_NUMERIC specifies the numeric data formatting.
LC_TIME specifies the date and time formatting.
LC_MESSAGES specifies the affirmative and negative expressions and language to be used in communication with the user.

Details of these variables can be found in the aforementioned standards which are hereby incorporated by reference.

The locale developer specifies values to each of the locale categories which particularize the type of formatting to be applied to the data to be processed or presented. For example, possible values for the locale category "monetary formatting" would be that for the United States, Germany or France which would result in the monetary data being formatted to be processed or presented according to the currency of the specified country (i.e. dollars, deutsche marks or francs, respectively). When the six locale categories are assigned specific values, they are collectively referred to as a "locale". The mentioned locale categories are referenced by the internationalized application program as that program is executed.

Additional background information for this subject matter, particularly for the notion and use of "locales" and internationalized application programs, is provided in the following patents, all assigned to International Business Machines Corporation and hereby incorporated by reference.

U.S. Pat. No. 5,835,768, entitled "Computer Operating System providing Means for Formatting Information in Accordance with Specified Cultural preferences", issued Nov. 10, 1998;

U.S. Pat. No. 5,907,326, entitled "System and Method for Updating Cultural Profiles with Dragging and Dropping Locale Objects", issued May 25, 1999;

U.S. Pat. No. 5,900,871, entitled "System and Method for Managing Multiple Cultural Profiles in an Information Handling System", issued May 4, 1999.

While the above standards provide a vehicle to generate internationalized application programs that enable users to vary the cultural sensitivity of the programs, their use has been cumbersome particularly when network communication in multiple locales is desired. Concurrent communication of information involving multiple locales is hindered by the necessity of the communication of long file names to distinguish between different locales or the transportation of large locale objects themselves on the network. Further, industry locale naming conventions that use mixed case alphabetics to differentiate between different locales are not supported on all platforms and the use of the long file names to differentiate between different locale names are not supported across all file systems.

It has been previously suggested on pages 197 and 198 of the August 1996 issue of the IBM Technical Disclosure Bulletin to incorporate defined triplets of language, country and encoding identifiers into a single hexadecimal representation known as a locale token. The locale token is compact and precise in its use and definition of the locale information it represents. While the use of a locale token, as described in the above article, is an improvement over previous techniques, it has been proven inadequate in providing locale environment identification and locale version control.

Therefore, it is an object of the present invention to provide a mechanism for locale environment identification and locale version control.

It is a further object of the invention to provide a locale correlator for identification and transmission of locale information within and among processes, components and systems.

It is another object of the invention to minimize the amount of data that must be transmitted to communicate locale information within and among processes, components and systems.

BRIEF DESCRIPTION OF THE INVENTION

In accordance with the present invention a three part locale identification triplet is provided. The identifier includes a table identifier (Table ID), locale version identifier (Locale Version ID) and a locale token identifier (Locale Token ID). The Locale Token ID is the only mandatory identifier in the triplet and addresses the need to uniquely identify the desired localization specifications through a concise unambiguous hexadecimal format. The Locale Version ID addresses the need to allow multiple variations of the locale specification to be defined for a given "root" locale called for by the Locale Token ID, and the Table ID addresses the need to provide a mechanism to identify and distinguish a particular instance of a locale identified by the Locale Token ID or the combination of the Locale Token and Locale Version ID's or to reference a user provided reference table.

In accordance with one aspect of the disclosed invention there is provided a computer implemented method for use of an internationalized version of a software application with a plurality of cultural preferences, the method comprises providing a plurality of locales each for customizing the international software application to one of the cultural preferences wherein said locales are stored and accessible at a plurality of storage locations, and using multiple part identifiers for accessing the locales, one identifier for each of the locales. Each identifier has a required part for identifying a root locale, and at least one first optional part for identifying one or more variations of the root locale, each provides a different cultural preference of the root locale, and a second optional part for identifying a particular instance of the locale identified by the required part of the identifier or both the required and first parts of the identifier, and using at least one lookup table for obtaining the particular locale instance.

In accordance with another aspect of the invention, there is provided a computer system comprising a computer network with one or more computers and a server containing an internationalized program for use with a plurality of cultural preferences, the program contains software for a plurality of locales each for customizing the international program to one of the cultural preferences wherein said locales are stored and accessible at a plurality of storage locations of the server. Software is included for multiple part identifier for selection of a requested locale from a computer of the network having one identifier for each of the locales. The identifiers have a required hexadecimal field for identifying a root locale, and at least one of a first optional part containing a hexadecimal field for identifying one or more variations of the root locale, each variation provides a different cultural preference of the root locale, and a second optional part containing a hexadecimal field for identifying a particular instances of the locale identified using the required hexadecimal field.

According to a further aspect of the disclosed invention there is provided a computer program on a computer usable medium wherein said program comprises program software for an internationalized version of a software application for use with a plurality of cultural preferences. Software is included for responding to a plurality of locales each for customizing the international software application to one of the cultural preferences, said locales being stored and accessible at a plurality of storage locations. Software is also included for multiple field identifiers, one identifier for each of the locales wherein said identifiers have a required digitally encoded field for identifying a root locale, and at least one of a first optional digitally encoded field for identifying one or more variations of the root locale, each variation to provide a different cultural preference of the root locale, and a second optional digitally encoded field for identifying a particular instance of the locale identified by the required field of the identifier.

BRIEF DESCRIPTION OF THE DRAWINGS

The present invention with its advantages and objects can best be understood from the following description of an embodiment while referring to the accompanying figures of which:

FIGS. 3A and 3B are charts showing examples of the relationships between locales and the locale identifier of the present invention;

DETAILED DESCRIPTION OF THE INVENTION

Figure 1:
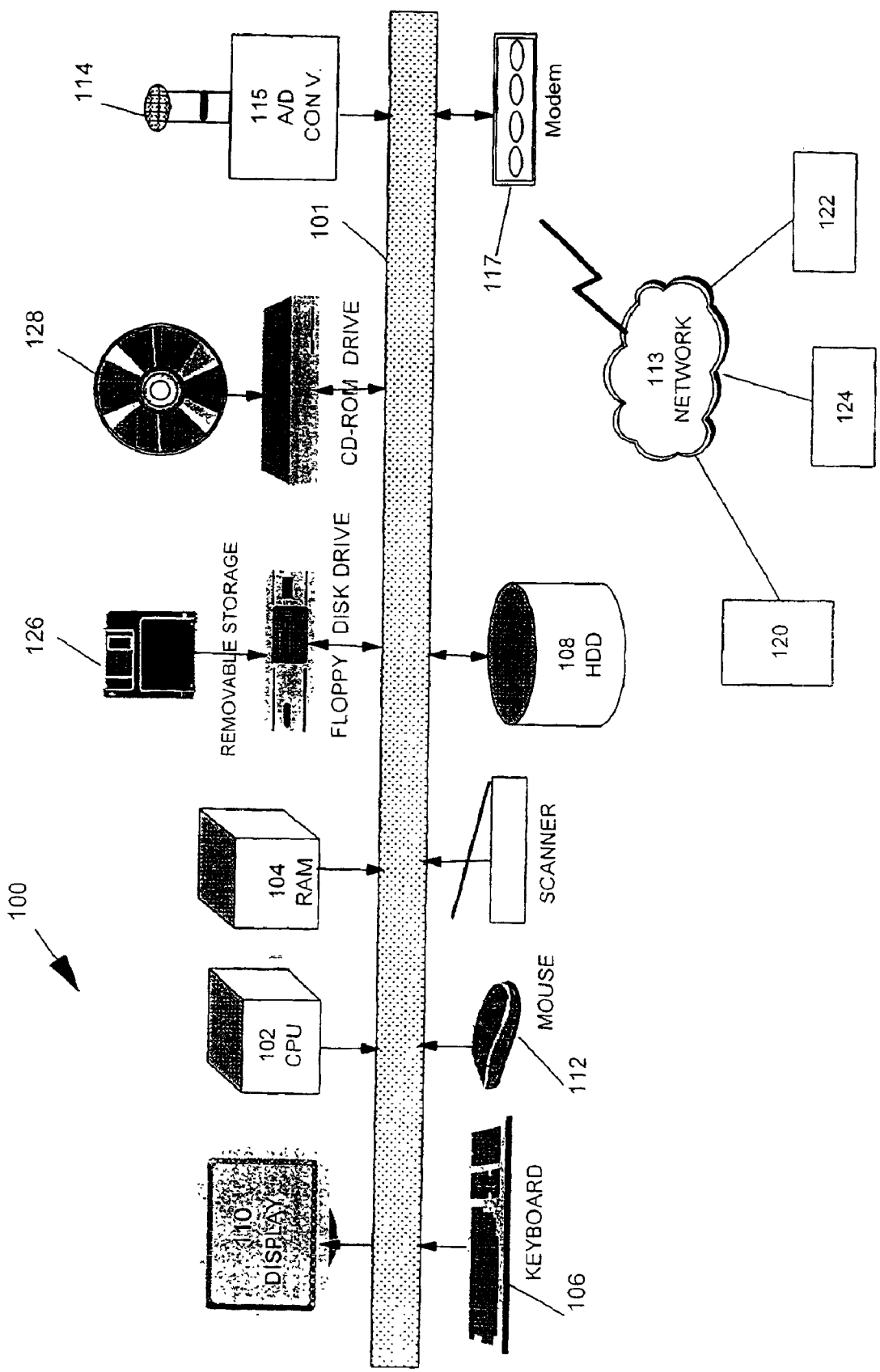
FIG. 1 is a block diagram of a computer system and network for use with the present invention.

The present invention is for use in connection with any properly configured general purpose computer system either standing alone or in a network of computers. An example of a general purpose computer is shown in FIG. 1. Such a computer system 100 includes a processing unit (CpU) 102 connected by a bus 101 to a random access memory 104, a high density storage device 108, a keyboard 106, a display 110 and a mouse 112. A modem 117 is provided to connect the computer system 100 to a network 113 through a standard telephone connection 119. The network includes one or more servers 120 and other computers 122 and 124.

In accordance with the present invention, a three part locale identification triplet is provided to enable the locale developer to specify values for each of the locale categories of an internationalized software application usable with computer systems and networks, such as those shown in FIG. 1. The software application can be for placement in the computer system 100 or can be located in the server 120 or another computer 122 or 124 of the network 113. The application program can be provided to the computer by way of magnetic or electro-optic medium 126 or 128, or by way of the electromagnetic medium of the network 113.

Figure 2:
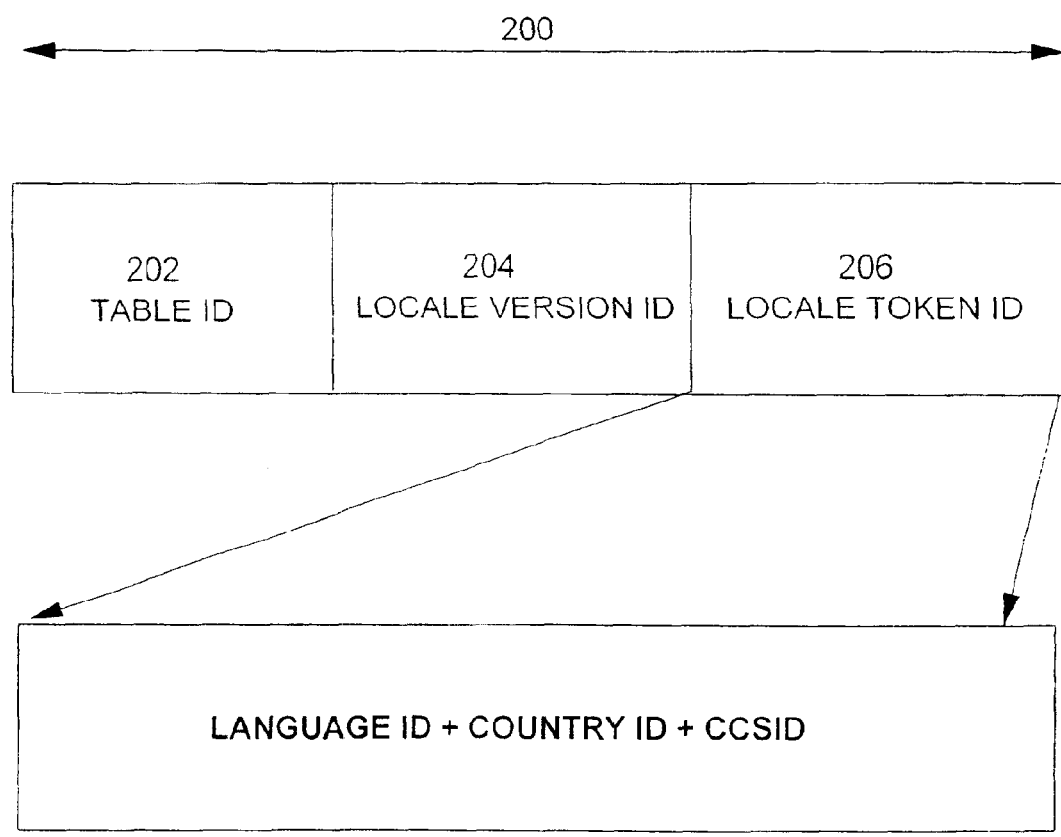
FIG. 2 is a diagram illustrating a locale identification triplet of the present invention for use in transmission of locale information.

As shown in FIG. 2, the three part locale identification triplet 200 comprises:

I. A Locale Token ID 206 which addresses the need to uniquely identify the localization specifications desired in a concise unambiguous hexadecimal format;

II. A Locale Version ID 204 which addresses the need to allow multiple variations of a locale specification for a given base locale defined by the Locale Token ID 206; and III. A Table ID 202 which addresses the need to provide a mechanism to identify and distinguish an instance of the locale identified by the Locale Token ID 206 or a combination of the Locale Token and the Locale Version ID's 206 and 204 or to incorporate a user (with system administration responsibility) provided reference table.

The triplet 200 containing the Table ID, Locale Version ID and Locale Token ID may be referred to as a "codon". The term codon is used herein to refer to the concatenation of the three 16-bit identifier values as a single entity.

The Locale Token ID is an assigned value for a unique combination of values representing the language, country and a coded character set identifier (CCSID). The Locale Token ID is a shorthand notation for a locale string that is identified under the column heading "Long Name" in FIG. 3. The Locale Token ID cannot be algorithmically decomposed to yield three separate elements. The decomposition of the Locale Token ID requires a table lookup. (See the above referenced U.S. Pat. No. 5,835,768).

The architected ranges for the 16 bit Locale Token ID are:
Reserved for future Use: 0000 through 0FFF
Country/Language Locales: 1000 through 5FFF
Mixed Category Locales: 6000 through BFFF—hybrid locales example French and Vietnamese collation in the same locale
Regional Locales: C000 through CFFF—regional locales such as locales applicable to the Nordic or Arabic
Specials: D000 through DFFF—industry specific locales such as a telephone book sort
Private Use (User Defined): E000 through EFFF
Reserved for future Use: F000 through FFFF.

The Locale Version ID is a reference to a particular variation of a locale identified by the Locale Token ID. As discussed hereinafter, the Locale Version ID is used to signal not just a variance but what type of variance as well. It differentiates one particular instance from another, for example, a base locale compared to the same locale with a modified collation specification (see FIG. 3a, row four).

The architected ranges for the 16-bit Locale Version ID are:
Reserved for future Use (root locale is 0): 0000 through 0FFF
Character Type Variant: 1000 through 5FFF—changes in character type attribute
Collation Type Variant: 6000 through AFFF—changes in the collation specification
Numeric Type Variant: B000 through BFFF—numeric specification changes
Monetary Type Variant: C000 through CFFF—monetary specification changes
Time Type Variant: D000 through DFFF—time and date specification changes
Private Use (User Defined): E000 through EFFF
Reserved for future Use: F000 through FFFF The Table ID is a specific reference to an instance of a system resource supporting a plurality of system tables designed to manage these token resources.

The architected ranges for the 16-bit Table ID are:
Reserved for future Use: 0000 through CFFF
Specials: D000 through DFFF
Private Use (User Defined): E000 through EFFF
Reserved for future Use: F000 through FFFF.

As an example to illustrate an application of the codon, FIGS. 3A and 3B tables show how the triplet identifiers or codon of the present invention may apply to Canadian locales. All values are for illustration only and may not represent actual assigned values. In the tables, the three leftmost columns of the table are for hexadecimal values for the Table ID 202, the Locale Version ID 204 and the Locale Token ID 206 where:

The "Table ID" column is for a 16-bit number identifying the specific instance of a system resource table to be used by the locale correlation methods.

The "Locale Version ID" column is for a 16-bit number identifying the specific version instance of a locale resource to be used by the locale correlation methods.

The "Locale Token ID" column is for a 16-bit number identifying the specific locale resource to be used by the locale correlation methods.

The locale resources and resource tables to provide the specific version of a locale resource and the specific instance of a system resource table are made available by the operating system of the platform or network on which the application is deployed.

The next six columns represent the cultural preferences identified by the codon where:

The "Language ID" column is for a two character alphabetic code identifying a language using ISO-639 assigned values.

The "Country ID" column is for a two character alphabetic code identifying a country using ISO-3166 assigned values.

The "CCSID" column contains a coded character set identifier which is a 16-bit number identifying a specific set of encoding scheme identifier, character set identifier(s), code page identifier(s) and additional coding related required information that uniquely identifies the coded graphic character representation used.

These three values, namely "Language ID", "Country ID" and "CCSID" are synthesized into the "Locale Token ID" as previously described.

The "CS ID" column contains the character set identifier which identifies the specific graphic character set being used.

The "CP ID" column contains a code page identifier which identifies a specification of code points from a defined coding structure for each graphic character in a set or in a collection of graphic character sets where each code point can only have one specific meaning.

The "Long Name" column contains a character string identifying the locale specification used following industry standard POSIX/XPG4 conventions.

The "Comment" column contains free form text providing additional information about the associated entry.

The entries in each row in FIGS. 3A and 3B are for a different codon. In each of the cases illustrated in FIG. 3A, the Table ID has a zero or non-meaningful value. In all of the illustrated cases of FIG. 3B, the Table ID has a non-zero value of 5 and the resultant codon represents a particular instance of a locale identified by one or both of the other two IDs, namely Locale Version ID and Locale Token ID. That is, the other illustrated characteristics of the locale does not change but the Table ID adds an additional factor. For instance, the Table ID could be used to denote a selection of IDs used for testing or to identify a set of IDs that have been subsequently replaced.

In each of the top three rows of both FIGS. 3A and 3B, the Version ID of the codon also has a zero value therefore, in each of these cases, only the Locale Token ID itself is meaningful. That is, only the Locale Token ID is needed to identify the locale. The Locale Token ID is referred to as the base or root locale.

In the topmost row, the Locale Token ID is "1C2A". This represents a locale with the characteristics identified by the headings of the six columns to the right of the locale token ID. Those six columns contain the following information about the locale:

The Language ID column contains "en" which indicates the language of the locale is English.
The Country ID column contains "CA" which indicates the country is Canada.
The CCSID column contains "25" which is the coded character set identifier used for the EBCDIC version of the Latin-1 character set.
The CSID column indicates the character set identifier is "697" which is associated with the Latin-1 character set.
The CPID column indicates the code page identifier is "37" which is associated with the EBCDIC version of the Latin-1 character.
The Long Name column indicates the locale used is the common English Canadian locale using the IBM 037 character standard or some alternative standard such as the ISO-8859-1 character standard. The IBM character set standard may be found in the Open Software Foundation (OSF) code page and character set registry at http://www.opengroup.org/rfc/rfc40.2.html and similar information can be found at ftp://ftp.isi.edu/in-notes/iana/assignments/character-sets.
The seventh column, Comment, provides textual information, is not part of the locale and describes the locale as using the EBCDIC encoding scheme, Latin-1 characters and the English language.

In the second row of both FIGS. 3A and 3B, the Locale Token ID is "1C3A" and the six columns to the right of the Locale Token ID column contain the following information about that locale:

The Language ID column contains the identifier "en" which indicates the language is English.
The Country ID column contains the identifier "CA" which indicates the country is Canada.
The CCSID column contains the identifier "1140" which is the coded character set identifier used for the EBCDIC version of the Latin-1 character set including the EURO symbol.
The CS ID column contains is the character set identifier "695" which is associated with the Latin-1 character set including the EURO symbol.
The CP ID column contains the code page identifier "1140" which is associated with the Latin-1 character set including the EURO symbol (in this case the code page identifier and the CCSID are the same).
The Long Name column contains an identifier which the locale used is a variation of the common English Canadian locale modified to use the EURO symbol.

The seventh column, Comment, provides textual information, is not part of the locale, and describes the locale as using the EBCDIC encoding scheme, Latin-1 characters with the addition of the EURO currency symbol.

In the third row in both FIGS. 3A and 3B, the Locale Token ID is "1C2B" and the six columns to the right of Locale Token ID column contain the following information about that locale:

The Language ID column contains the identifier "fr" which means the language is French.
The Country ID column contains the identifier "CA" which means the country is Canada.
The CCSID column contains the indicator "25" which indicates the coded character set is the EBCDIC version of the Latin-1 character set.
CS ID column contains the identifier "697" which indicates the character set is the Latin-1 character set.
CP ID column contains the identifier "25" which indicates the character set is the Latin-1 character set (in this case the code page identifier and the CCSID are the same).
Long Name column identifier indicates the locale used is the common French Canadian locale.
The seventh column, Comment, provides textual information, is not part of the locale, and describes the locale as using the EBCDIC encoding scheme, Latin-1 characters and the French language.

Unlike the previously described three rows, in the fourth row of FIG. 3a, the Version ID column contains a non-zero value of 6000, indicating a collation change to the base locale. The Locale Token ID is 1C2A because this locale is a version of the base locale. The Long Name column indicates the locale used is a variation of the common English Canadian locale described in connection with the third row. The Comment column provides textual information, is not part of the locale and describes the locale as using the EBCDIC encoding scheme, Latin-1 characters and that the collation order is set to have uppercase letters before lowercase letters.

Figure 4:
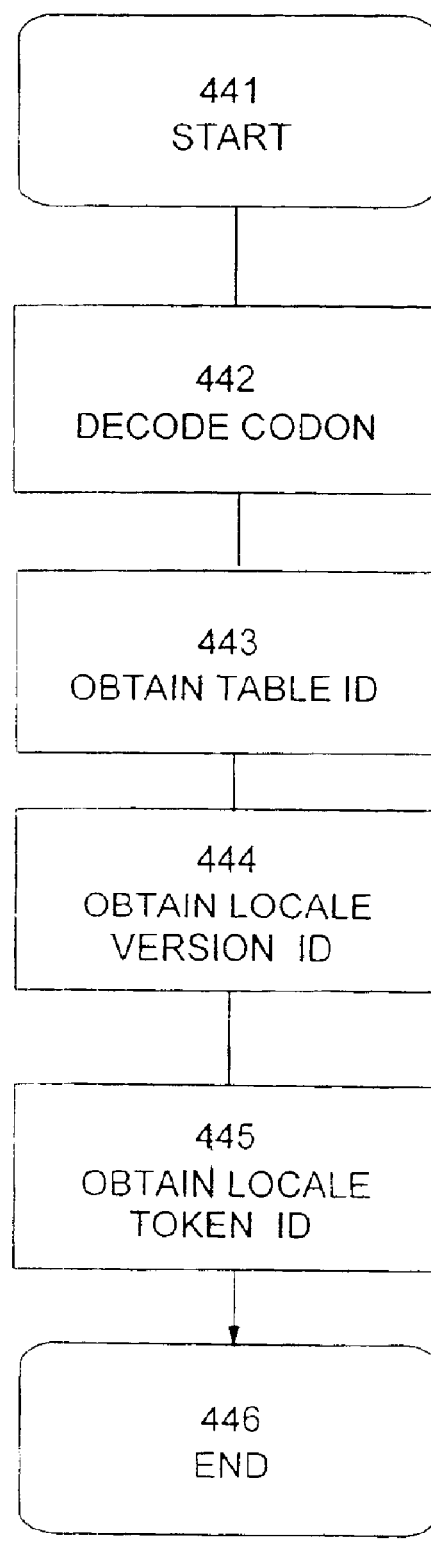
FIG. 4 is a flow diagram of the locale identification triplet decomposition process.

FIG. 4 shows the steps associated with the decomposition of a codon. The individual elements are used in the subsequent process of referencing and using a locale resource object in connection with FIG. 5. The user starts the basic process of FIG. 4 by obtaining a codon. This can be done with the computer system 100 of FIG. 1 by using the mouse 112 to perform a drag and drop operation on the display 110 (step 441). The codon could be selected from a list of codons identified by the locale characteristics or by an icon representative of the locale.

Once the desired codon has been selected, the computer performs the following steps:
Decodes the codon using a substring operation where the codon is split into three 16-bit elements (step 442).
Obtains the Table ID by taking the first 16-bit value and placing it into an assigned memory location (step 443).
Obtains the Locale Version ID by taking the second 16-bit value and placing it into an assigned memory location (step 444).
Obtains the Locale Token ID by taking the third 16-bit value and placing it into an assigned memory location (step 445).
Ends the process by the storing of the last value in memory for subsequent processing (step 446).

Figure 5:
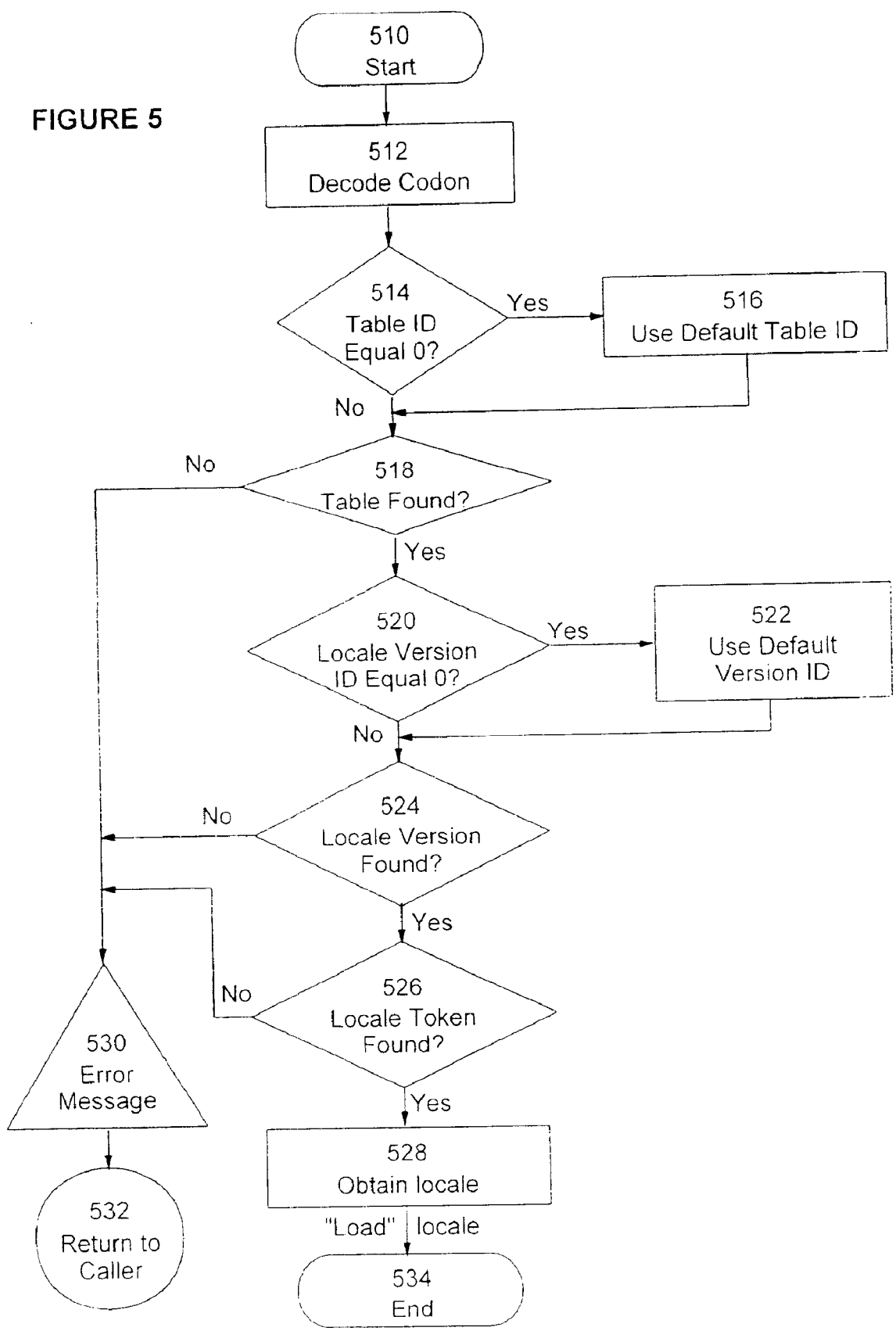
FIG. 5 is a flow diagram showing how the identification triplet is used to obtain a locale.

FIG. 5 shows the steps associated with the usage of the codon to obtain a locale in a software product. The individual elements of the codon are used in the subsequent processing to reference a locale resource object which is locale services made available from the operating system of the platform or network where the software product is deployed. The locale object is then available for proper processing of the data associated with a unit of work including both a request for processing a locale sensitive process (for example a request to produce a list of names collated according to the rules or conventions of a particular locale) and a data object representing the data to be used by the process request.

The first two steps shown in FIG. 5, of obtaining the codon and placing it in memory (steps 510 and 512, respectively) have been previously discussed in connection with FIG. 4. They are the steps of obtaining the codon as described in connection with step 441 of FIG. 4 and placing the codon in memory as described in connection with steps 441 to 446 of FIG. 4. With the codon available in memory in its three component elements the computer system 100 will:

Check to see if the Table ID is present in memory (step 514) and if present, use the value provided by the Table ID (step 518).

If Table ID is missing or its value is 0, then use the default table value (step 516) obtained from the locale resources lookup table of the operating system.

Check the Locale Version ID to see if it is present (step 520) and if present, use the value provided by Locale Version ID (step 524).

If Local Version ID is missing or its value is 0, then use the default Locale Version ID value (step 522) obtained from the locale services lookup table of the operating system.

Look for Locale Token ID (step 526).

If Locale Token ID cannot be located generate an error message (step 530) and return to the caller (step 532).

If the requested Locale Token ID is found, obtain the Long Name and initiate a load of the locale object resources from the Ids or from the locale services available from the operating system. Use the resultant load information (addressability to the in-memory locale specifications) to process the data as requested and end the process (step 534).

Above we have described one embodiment of the invention. Those skilled in the art may determine that a number of changes may be made in that embodiment without departing from the spirit and scope of the invention. Therefore it should be understood that the present invention is not limited to the above described embodiment but includes those covered by the spirit and scope of the appending claims.

The embodiments of the invention in which an exclusive property or privilege is claimed are defined as follows:

1. A computer implemented method for use of an internationalized version of a software application with a plurality of cultural preferences comprising the steps of:
   providing a plurality of locales each for customizing the international software application to one of the cultural preferences, said locales being stored and accessible at a plurality of storage locations;
   using multiple part identifiers for accessing the locales, one identifier for each of the locales, each identifier having:
   a required part for identifying a root locale, and at least one of:
   a first optional part for identifying one or more variations of the root locale, each variation to provide a different cultural preference of the root locale, and
   a second optional part for identifying a particular instance of the locale identified by the required part of the identifier or both the required and first parts of the identifier; and
   using at least one lookup table for obtaining the particular locale instance.

2. The computer implemented method of claim 1, wherein said internationalized version of a software application is used on a computer system having an operating system and wherein said table establishes values for the locales in storage from locale services of said operating system.

3. The computer implemented method of claim 2, wherein the fields are hexadecimal fields subdivided into ranges where:
   the hexadecimal field for identifying the root locale includes one range for country/language locales and a plurality of other ranges for regional hybrids and industry specific locales;
   the hexadecimal field for identifying variants of the root locale for variants in character types, numeric specifications, time and date specifications and user selected specifications; and
   the hexadecimal field for instances of one or both the previously mentioned fields includes a field for a user defined purpose.

4. A computer system comprising:
   a computer network with one or more computers and a server containing an internationalized program for use with a plurality of cultural preferences, which program contains;
   software for a plurality of locales each for customizing the international program to one of the cultural preferences, said locales being stored and accessible at a plurality of storage locations of the server; and
   software for multiple part identifier for selection of a requested locale from a computer of the network, one identifier for each of the locales, the identifiers having a required hexadecimal field for identifying a root locale, and at least one of:
   a first optional part containing a hexadecimal field for identifying one or more variations of the root locale, each variation to provide a different cultural preference of the root locale; and
   a second optional part containing a hexadecimal field for identifying a particular instance of the locale identified using the required hexadecimal field.

5. The computer system of claim 4, wherein the multiple part identifier is a three part identifier made up of the required and two optional hexadecimal fields.

6. The computer system of claim 5, including software for a software table with locale instances selected by non-zero values in the required field and the optional fields of the identifier.

7. The computer system of claim 6, wherein said software table provides addresses for values of the locales in storage.

8. The computer system of claim 4, wherein the hexadecimal fields are subdivided into ranges where:
   the hexadecimal field for identifying the root locale includes one range for country/language locales and a plurality of other ranges for regional hybrids and industry specific locales;

the hexadecimal field for identifying variants of the root locale for variations in character type, numeric specifications and user selected specifications; and the hexadecimal field for instances of one or both of the previously mentioned fields includes a field for user defined purposes.

9. A computer program on a computer usable medium said program comprising:

program software for an internationalized version of a software application for use with a plurality of cultural preferences;

software for responding to a plurality of locales each for customizing the international software application to one of the cultural preferences, said locales being stored and accessible at a plurality of storage locations; and software for multiple field identifiers, one identifier for each of the locales, said identifiers having:

a required digitally encoded field for identifying a root locale, and at least one of:

a first optional digitally encoded field for identifying one or more variations of the root locale, each variation to provide a different cultural preference of the root locale, and a second optional digitally encoded field for identifying a particular instance of the locale identified by the required field of the identifier.

10. The computer program of claim 9, wherein said fields are hexadecimal fields.

11. The computer program of claim 10, wherein the multiple field identifiers contain both the first and second optional fields and which the required field and at least one of the optional fields contains a non-zero value.

12. The software products of claim 10, wherein the hexadecimal fields are subdivided into ranges where:

the hexadecimal field for identifying the root locale includes one range for regular locales and a plurality of other ranges for regional hybrids and industry specific locales;

the hexadecimal field for identifying variants of the root locale includes fields for variations in character type, numeric specifications, time and data specifications and user selected specifications; and the hexadecimal field for instances of one or both the previously mentioned fields includes a field for user defined purposes.

13. The computer program of claim 9, wherein the required field and both the optional fields have non-zero values with the second optional field identifying a particular instance of the locale identified by the required field and the first optional field.

14. The computer program of claim 9 including at least one lookup table software for obtaining instances of locales when accessed by an appropriate three field identifier.

15. The computer program of claim 14, wherein said first software table establishes values for the locales in storage from local services of an operation system.

16. The computer program of claim 14, wherein said lookup table software includes at least two lookup tables one table selected by non-zero values in the required field or the required field and the first optional field of the identifier and the second table selectd by a non-zero value in the second optional field of the identifier.

* * * * *